United States Patent
Ruan et al.

(10) Patent No.: US 12,262,091 B2
(45) Date of Patent: Mar. 25, 2025

(54) VIDEO PLAYING METHOD AND APPARATUS, AND DEVICE AND STORAGE MEDIUM

(71) Applicant: Beijing Zitiao Network Technology Co., Ltd., Beijing (CN)

(72) Inventors: Wentao Ruan, Beijing (CN); Weiming Zheng, Beijing (CN); Zefan Jiang, Beijing (CN); Jiongyan Zhang, Beijing (CN)

(73) Assignee: Beijing Zitiao Network Technology Co., Ltd., Beijing (CN)

(*) Notice: Subject to any disclaimer, the term of this patent is extended or adjusted under 35 U.S.C. 154(b) by 0 days.

(21) Appl. No.: 18/395,142

(22) Filed: Dec. 22, 2023

(65) Prior Publication Data

US 2024/0129587 A1    Apr. 18, 2024

Related U.S. Application Data

(63) Continuation of application No. PCT/CN2022/111942, filed on Aug. 12, 2022.

(51) Int. Cl.
*H04N 21/472* (2011.01)
*H04N 21/431* (2011.01)
(Continued)

(52) U.S. Cl.
CPC ... *H04N 21/47217* (2013.01); *H04N 21/4662* (2013.01); *H04N 21/4668* (2013.01)

(58) Field of Classification Search
None
See application file for complete search history.

(56) References Cited

U.S. PATENT DOCUMENTS 9,639,634 B1* 5/2017 Greene ............... G06F 16/4387
2016/0018959 A1* 1/2016 Yamashita ........... G06F 3/0484
715/716

(Continued)

FOREIGN PATENT DOCUMENTS

CN    106792075 A    5/2017
CN    108012584 A    5/2018
(Continued)

OTHER PUBLICATIONS

Annotated provided English translation of CN 112685599 A (Year: 2021).*

(Continued)

*Primary Examiner* — Hung Q Dang

(57) ABSTRACT

Disclosed in the embodiments of the present disclosure are a video playing method and apparatus, and a device and a storage medium. The method comprises: detecting that a preset application program is switched from a non-background running state to a background running state during the process of playing a first video; continuing to play the first video in the background by means of the preset application program, and determining a second video from a second video candidate set according to historical operation information of the current user for the preset application program and a preset background video recommendation model; and when a preset video switching event is detected, playing the second video in the background by means of the preset application program.

19 Claims, 3 Drawing Sheets detect that a preset application switches from a non-background running state to a background running state in the process of playing a first video, wherein the preset application is used to play a video stream — 101 continuously play the first video in the background through the preset application, and determine a second video from a second video candidate set according to historical operation information of a current user for the preset application and a preset background video recommendation model, wherein the preset background video recommendation model is used to determine background playback videos to be recommended, the second video candidate set is used to filter videos there-from in a background playback mode, the second video candidate set is different from the first video candidate set, and the first video candidate set is used to filter videos there-from in a non-background playback mode — 102 when a preset video switching event is detected, play the second video in the background through the preset application — 103

(51) Int. Cl.
*H04N 21/442* (2011.01)
*H04N 21/443* (2011.01)
*H04N 21/45* (2011.01)
*H04N 21/458* (2011.01)
*H04N 21/466* (2011.01)

(56) References Cited

U.S. PATENT DOCUMENTS

| | | | |
|---|---|---|---|
| 2017/0041680 A1 | 2/2017 | Lewis et al. | |
| 2017/0126774 A1* | 5/2017 | Woodman | G06F 9/449 |
| 2017/0180805 A1 | 6/2017 | Tu | |
| 2017/0353705 A1* | 12/2017 | Rivera | G11B 27/11 |
| 2018/0376178 A1* | 12/2018 | Cormican | H04N 21/4302 |
| 2019/0295129 A1* | 9/2019 | Chudaitov | G06Q 30/0265 |
| 2020/0068165 A1* | 2/2020 | Greene | G06F 9/445 |
| 2020/0304858 A1 | 9/2020 | Smith et al. | |

FOREIGN PATENT DOCUMENTS

| | | |
|---|---|---|
| CN | 111079016 A | 4/2020 |
| CN | 111741336 A | 10/2020 |
| CN | 112685599 A | 4/2021 |
| CN | 113727169 A | 11/2021 |
| JP | 201613859 A | 7/2016 |
| JP | 2021077994 A | 5/2021 |
| WO | 2011142249 A1 | 11/2011 |

OTHER PUBLICATIONS

International Search Report issued Nov. 3, 2022 in International Application No. PCT/CN2022/111942 (2 pages).
First Office Action issued Apr. 29, 2022 in Chinese Application No. 202110996241.6, with English translation (10 pages).
European Search Report for EP Patent Application No. 22860273.6, Issued on Jul. 30, 2024, 8 pages.
Notice of Reasons for Refusal issued in JP Appl. No. 2023-579296 issued Feb. 4, 2025, 9 pages.

* cited by examiner

VIDEO PLAYING METHOD AND APPARATUS, AND DEVICE AND STORAGE MEDIUM

The present application claims priority to the PCT application No. PCT/CN2022/111942 filed on Aug. 12, 2022 and the Chinese Patent Application No. 202110996241.6, filed with the Chinese Patent Office on Aug. 27, 2021. The disclosure of each of these applications is incorporated herein by reference.

TECHNICAL FIELD

Embodiments of the present disclosure relate to the technical field of Internet and, for example, to a video playback method and apparatus, a device and a storage medium.

BACKGROUND

With the rapid development of information technology and the popularization of mobile Internet, applications can provide users with more and more network information, among which, a video recommendation function of applications is favored by more and more users.

Currently, applications usually recommend videos to users by pushing video streams. While watching videos, users may not be able to continue watching, such as the terminal screen going out, switching to other applications, or switching to the terminal desktop, etc. In this case, the video stream push effect of related solutions is not ideal and needs to be improved.

SUMMARY

In a first aspect, an embodiment of the present disclosure provides a video playback method, including:
  detecting that a preset application switches from a non-background running state to a background running state in a process of playing a first video, where the preset application is used to play a video stream;
  continuously playing the first video in the background through the preset application, and determining a second video from a second video candidate set according to historical operation information of a current user for the preset application and a preset background video recommendation model, where the preset background video recommendation model is used to determine a background playback video to be recommended, the second video candidate set is used to filter a video there-from in a background playback mode, the second video candidate set is different from the first video candidate set, and the first video candidate set is used to filter a video there-from in a non-background playback mode; and
  when a preset video switching event is detected, playing the second video in the background through the preset application.

In a second aspect, an embodiment of the present disclosure provides a video playback apparatus, including:
  a state detection module, which is configured to detect whether a preset application switches from a non-background running state to a background running state in a process of playing a first video, where the preset application is used to play a video stream;
  a video determination module, which is configured to continuously play, after detecting that the preset application switches from the non-background running state to the background running state in the process of playing the first video, the first video in the background through the preset application, and determine a second video from a second video candidate set according to historical operation information of a current user for the preset application and a preset background video recommendation model, where the preset background video recommendation model is used to determine a background playback video to be recommended, the second video candidate set is used to filter a video there-from in a background playback mode, the second video candidate set is different from the first video candidate set, and the first video candidate set is used to filter a video there-from in a non-background playback mode; and
  a playback switching module, which is configured to play, when a preset video switching event is detected, the second video in the background through the preset application.

In a third aspect, an embodiment of the present disclosure provides a computer-readable storage medium on which a computer program is stored, when the computer program is executed by a processor, the video playback method provided in the embodiment of the present disclosure being implemented.

In a fourth aspect, an embodiment of the present disclosure provides an electronic device, including a memory, a processor, and a computer program that is stored in the memory and executable on the processor, when the processor executes the computer program, the video playback method provided in the embodiment of the present disclosure being implemented.

DETAILED DESCRIPTION

Embodiments of the present disclosure will be described below with reference to the accompanying drawings. Although some embodiments of the present disclosure are shown in the accompanying drawings, it should be understood that the present disclosure may be embodied in various forms. It should be understood that the accompanying drawings and embodiments of the present disclosure are for illustrative purposes only.

It should be understood that various steps described in the method implementations of the present disclosure may be executed in different orders and/or in parallel. In addition, method implementations may include additional steps and/or omit performance of illustrated steps.

The term "include" and its variations used herein are open-ended, i.e., "including but not limited to". The term "based on" means "based at least in part on". The term "one embodiment" means "at least one embodiment"; the term "another embodiment" means "at least one additional embodiment"; and the term "some embodiments" means "at least some embodiments". Relevant definitions of other terms will be given in the description below.

It should be noted that concepts such as "first" and "second" mentioned in the present disclosure are only used to distinguish different apparatuses, modules or units.

It should be noted that the modifications of "one" and "a plurality of" mentioned in the present disclosure are illustrative. Those skilled in the art should understand that unless the context clearly indicates otherwise, it should be understood as "one or a plurality of".

In the following embodiments, optional features and examples are provided synchronously in each embodiment. Features recorded in the embodiments can be combined to form a plurality of optional solutions. Each numbered embodiment should not be regarded as just one technical solution.

Embodiments of the present disclosure provide a video playback method and apparatus, a storage medium and a device. Thus, existing video playback solutions can be optimized.

Figure 1:
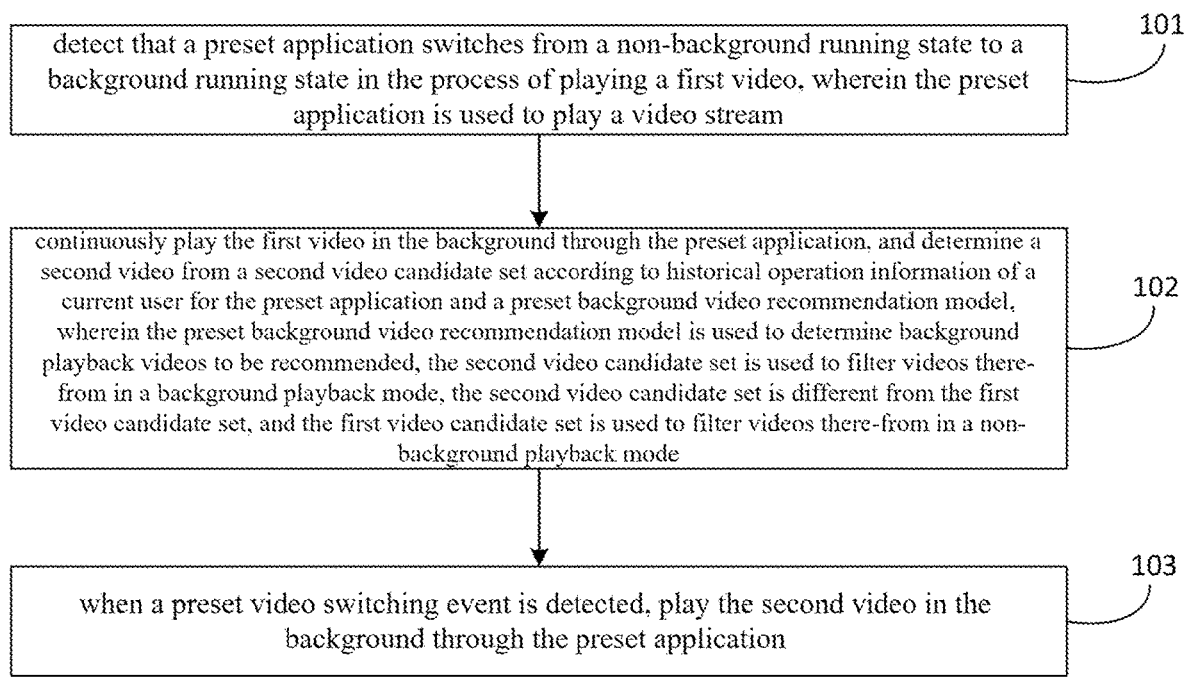
FIG. 1 is a schematic flowchart of a video playback method provided in an embodiment of the present disclosure.

FIG. 1 is a schematic flowchart of a video playback method provided in an embodiment of the present disclosure. The method can be executed by a video playback apparatus, where the apparatus can be implemented by at least one of software and hardware, and can generally be integrated in an electronic device. The electronic device may be a server, or other devices such as a mobile phone or a tablet computer. As shown in FIG. 1, the method includes:

Step 101, detect that a preset application switches from a non-background running state to a background running state in the process of playing a first video, where the preset application is used to play a video stream.

In the embodiment of the present disclosure, the type of the preset application may be a short video application or applications of other types. The preset application can provide a video stream push function. The source of the video stream, etc. can be set by the preset application according to actual needs, which video stream, for example, can include videos uploaded to a server by users who are video authors, and can also include videos produced by a platform party corresponding to the preset application, etc. The preset application can generally be installed as a client in the terminal used by a user, and cooperates with the corresponding server to provide the user with video streaming push services.

Exemplarily, when an application is running in the terminal to which it belongs, the running state generally includes a non-background running state and a background running state. When in the non-background running state, the preset application generally occupies the entire terminal screen, and a video playback page can be displayed. At this time, the user can view the video content by watching the screen, and can also input related playback control operations or other operations based on the video playback page. When the preset application is in the background running state, the terminal may be in a state such as turning off the screen or locking the screen, or other applications are running in the non-background, that is, the interfaces of other applications are displayed on the screen now, or the terminal displays the desktop. At this time, the preset application may run as a background service or background process, a normal page of the preset application cannot be displayed on the screen generally, related content of the preset application may not be displayed, or the preset application may be displayed by means of movable controls that take up a small amount of screen space such as a floating window or a floating control bar.

Exemplarily, the preset application can play the first video in the non-background running state, and the video content can be seen on the screen at this time. In the process of playing the first video, the user may need to use other applications and can switch the preset application to run in the background.

In the embodiment of the present disclosure, with regard to the detection mode for detecting whether the preset application is switched from the non-background running state to the background running state, exemplarily, running state information of the preset application can be acquired from system information of the terminal to which the application belongs, so as to determine whether it is detected that the running state of the preset application is switched from the non-background running state to the background running state. In addition, switching from the non-background running state to the background running state is generally performed in response to a user operation. For example, the user can trigger the switch by triggering a control for switching to the background. In this case, whether the control is triggered can be detected, so as to determine whether it is detected that the running state of the preset application is switched from the non-background running state to the background running state.

Step 102, continuously play the first video in the background through the preset application, and determine a second video from a second video candidate set according to historical operation information of a current user for the preset application and a preset background video recommendation model, where the preset background video recommendation model is used to determine background playback videos to be recommended, the second video candidate set is used to filter videos there-from in a background playback mode, the second video candidate set is different from the first video candidate set, and the first video candidate set is used to filter videos there-from in a non-background playback mode In the embodiment of the present disclosure, when a non-background playback state is switched to a background playback state, a non-background playback video can continue to be played in the background, so that the user can more completely acquire relevant information of the video, thereby ensuring the video consumption experience. Continuing to play can be understood as determining a time point corresponding to the current playback progress in the first video according to the moment when the non-background running state is switched to the background running state, and continuing to play an audio corresponding to the first video from the determined time point.

In the embodiment of the present disclosure, on the basis of continuing to play the first video, a video suitable for background playback is also determined as the next video of the first video in the video stream. Exemplarily, when recommending videos, the preset application generally selects videos from a video candidate set (which can also be understood as a video candidate pool). In related art, some applications select videos from the video candidate set for playback when running in the non-background, and will stop playing and not continue to recommend videos after switching from the non-background running state to the background running state. While in the embodiment of the present disclosure, in order to ensure that the preset application can implement continuous video recommendations in the background, a background playback mode is set, and a second video candidate set is configured for the background playback mode for selecting videos there-from when in the background running state for background playback.

In the embodiment of the present disclosure, corresponding video recommendation models can be provided respectively for non-background video playback and background video playback, that is, a preset non-background video recommendation model and a preset background video recommendation model. The preset non-background video recommendation model corresponds to the first video candidate set, and the first video candidate set is used to filter videos there-from in the non-background playback mode. Generally, the preset non-background video recommendation model is used to determine, from the first video candidate set, non-background playback videos to be recommended. The preset background video recommendation model corresponds to the second video candidate set, and the second video candidate set is used to filter videos there-from in the background playback mode. Generally, the preset background video recommendation model is used to determine, from the second video candidate set, background playback videos to be recommended. The mode of determining the preset non-background video recommendation model and the first video candidate set may be the same as or different from the implementations in related art. The preset background video recommendation model may be a neural network model, and actual model structure, parameters and training process are not limited and can be set according to the actual situation.

Videos generally include image content and audio content. When acquiring picture information and sound information at the same time, the user can have a better understanding of the overall video. However, when the preset application is in the background running state, the user cannot acquire the picture information, that is, the image content is missing. For videos with rich image content, it is difficult to effectively understand the video content solely by relying on the audio content. Different videos in the video stream usually have certain differences. In the embodiment of the present disclosure, videos in the second video candidate set can be targeted, according to the characteristics of background playback, to include videos that are more suitable for listening to.

Exemplarily, videos in the second video candidate set satisfy preset conditions, and the preset conditions can be set according to whether the videos are suitable for users to listen to, that is, the preset conditions can include being suitable for users to listen to. Optionally, the preset conditions include at least one of matching a preset video category, the ratio of the duration containing voice content to the total duration of the videos being greater than a preset ratio threshold, and the total duration of the videos being greater than a preset duration threshold.

Exemplarily, the division mode and division granularity of video categories can be set according to the actual situation, which video categories, for example, can include a cross talk category, a talk show category, a sketch category, a singing category, a dancing category, a scenic travel category, a daily life sharing category, etc. The cross talk category, talk show category, singing category, etc. may contain more vocal performances, and can be set as preset video categories since the lack of picture information may have less impact on understanding the entire video. The dancing category may contain more physical performances, and the scenic travel category may contain more scenery, etc., so that similar categories can be excluded from the preset video categories since the lack of picture information may have a greater impact on understanding the entire video.

The sketch category and daily life sharing category may include more picture information and sound information at the same time, and can be determined, according to actual needs, whether to be set as preset video categories, and can also be determined, combined with other factors, whether to be placed in the second video candidate set.

Exemplarily, when videos contain a lot of voice content, the sound information is richer, and even if the picture information is missing, the videos still have a certain listening value for the user. Therefore, the videos with the ratio of the duration containing voice content to the total duration of the videos being greater than the preset ratio threshold can be put into the second video candidate set. The duration containing voice content can refer to the sum of the durations of one or more components (which can be understood as segments) in the videos that contain voice content. Voice recognition technology can be used to identify voice components, so as to determine the duration containing voice content. For example, a voice activity detection (VAD) model can be used to identify videos. Roles of the VAD model can include identifying voice segments and non-voice segments from a voice signal. The VAD model is used to recognize one or more voice segments from audio data corresponding to the videos, and calculate the sum of the durations of the recognized voice segments, that is, to obtain a duration containing the voice content. The preset ratio threshold can be set according to actual needs, such as 60%, etc.

Exemplarily, due to the stronger expressive ability of picture information, in the process of video creation or production, in the case that the total duration of videos is expected to be short, the information expected to be displayed to the user will usually be reflected in pictures as much as possible in order to attract other users to browse the videos. Therefore, the picture content of videos of such type will also be relatively rich. On the contrary, in the case that the total duration of videos is expected to be long, then the picture content may not need to be very rich. In the embodiment of the present disclosure, based on the above considerations, the preset conditions can be set according to the total duration of videos. For example, when the total duration of videos is greater than the preset duration threshold, the preset conditions are met. The preset duration threshold may be determined according to the range of a video length allowed to be played in the preset application, and, for example, may be the median of the range, etc.

Optionally, in order to more accurately filter videos suitable for listening to and add same to the second video candidate set, the preset conditions may be set in combination with at least two of the above conditions or in combination with other conditions.

In the embodiment of the present disclosure, the current user can be understood as a user who is using the preset application, and the historical operation information of the current user for the preset application can be understood as relevant information that the current user performs various operations on the preset application within a preset time period before the current moment. The preset time period can be set according to actual needs, for example, one month forward from the current moment. The operations performed by the user may include, for example, clicks, likes, comments, favorites, forwarding, pausing, switching to the next, switching to the previous, viewing the video author's homepage, etc. The relevant information of the operations may include, for example, the frequency of operations, the time of operations (which may include a specific time, such as 8 o'clock in the morning, and may also include a relative time, such as the time of an switching operation relative to the starting point of video playback, for example, switching to the next video when the current video plays for 1 minute, thus the playback duration of the videos can be determined), an operation object (such as which video or type of videos to operate on), etc. The relevant information of the operations may also include a state that the preset application enters due to the user not performing the operations, such as the user not switching to the next video in the process of playing the current video, resulting in playing the current video completely, entering a loop playback state or automatically switching to play the next video, etc.

Exemplarily, the historical operation information may include non-background historical operation information and background historical operation information. The non-background historical operation information can be understood as relevant information that various operations are performed in the non-background, and the background historical operation information can be understood as relevant information that various operations are performed in the background. Generally, there are relatively few background operations which, for example, may include pausing, switching to the next, switching to the previous, favorites, etc. The relevant information may include whether a video is played completely and the duration that video is played.

The historical operation information of the current user for the preset application can reflect some of the current user's preferences for different videos. In the embodiment of the present disclosure, the historical operation information can be applied to video recommendations with the user's permission, so that videos to be played in the background can be determined in a more personalized manner for the current user according to the historical operation information and the preset background video recommendation model.

Exemplarily, the historical operation information and feature information (which, for example, may include video tags, video authors, video duration, video popularity, video image information, video audio information and other relevant information) of each candidate video in the second video candidate set are input into the preset background video recommendation model as input data, and the second video is determined according to an output result of the preset background video recommendation model.

Step 103, when a preset video switching event is detected, play the second video in the background through the preset application.

Exemplarily, in the processing of the first video continuing to be played in the background, when a preset video switching event is detected, the second video can be played in the background through the preset application. Exemplarily, the audio corresponding to the second video can be played, so that video switching in the background playback mode is implemented. The preset video switching event can be understood as an event that triggers background video switching. The background video switching can be automatically triggered by the system or actively triggered by the user, and can be set according to actual needs.

In the video playback method provided in the embodiment of the present disclosure, a preset application switching from a non-background running state to a background running state in a process of playing a first video is detected; the first video is continuously played in the background through the preset application, and a second video is determined from a second video candidate set according to historical operation information of a current user for the preset application and a preset background video recommendation model; and when a preset video switching event is detected, the second video is played in the background through the preset application. By means of the above implementations, video recommendations of the preset application respectively in the non-background running state and the background running state are distinguished; after the non-background running state is switched to the background running state, the video being played continues to be played in the background, and a video recommendation model and a video candidate set which are different from those in the non-background running condition are adopted; videos suitable for being played in the background are determined with reference to the historical operation information of the current user; and the videos are played when a preset video switching event is detected, so that users acquiring continuity of video information can be ensured, and personalized video recommendations are more accurately carried out in the background running state, thereby improving the performance of applications.

In some embodiments, after starting playing the second video in the background through the preset application, the method further includes: when the preset video switching event is detected, playing a third video in the background through the preset application, where the third video is determined from the second video candidate set according to the historical operation information of the current user for the preset application and the preset background video recommendation model. The advantage of such setting lies in that switching playback between a plurality of videos determined by the preset background video recommendation model can be supported. The historical operation information based on which the third video is determined may be the same as or different from the historical operation information based on which the second video is determined. If the historical operation information based on which the third video is determined and the historical operation information based on which the second video is determined are the same, it can be understood that a plurality of background playback videos to be recommended can be determined at one time according to the historical operation information and the preset background video recommendation model, which background playback videos to be recommended can be a video queue. When the preset video switching event is detected, the next video in the video queue is played to ensure push efficiency. If the historical operation information based on which the third video is determined and the historical operation information based on which the second video is determined are different, it can be understood that the historical operation information is updated according to the operation information in the process of playing the second video, and the third video is determined according to the updated historical operation information and the preset background video recommendation model, so that the recommendation results are more accurate.

In some embodiments, detecting a preset video switching event may include: detecting that the current video has finished playing. The advantage of such setting lies in that the next video can be automatically played after the current video has finished playing. Since the preset application is in the background running state, it may not be convenient for the user to operate the preset application at this time. Automatic playback can help users acquire new video content while reducing user operations, thereby improving the video push efficiency and the utilization of platform resources.

In some embodiments, detecting a preset video switching event may include: receiving a video switching instruction input by the current user. The advantage of such setting lies in that the current user can quickly switch to the playback of the next video when not interested in the video that is currently played, so as to improve interaction efficiency. Optionally, when a floating control bar corresponding to the preset application is displayed on the screen, the video switching instruction input by the current user can be received based on the floating control bar. For example, the floating control bar can contain a "next" button, and the user clicks on the button to enter the video switching instruction. Optionally, the video switching instruction can also be input through voice. In this case, there is no need to display the floating control bar, so that screen display space is saved. It can also be applied to situations where there is a need for switching when the user is a certain distance away from the terminal, such as putting down the phone to do something else.

In some embodiments, the historical operation information includes non-background historical operation information and background historical operation information, where determining a second video from a second video candidate set according to historical operation information of a current user for the preset application and a preset background video recommendation model includes: inputting the non-background historical operation information into the preset non-background video recommendation model, and acquiring an intermediate output result of the preset non-background video recommendation model, where the preset non-background video recommendation model is used to determine non-background playback videos to be recommended, and the intermediate output result includes user feature information of the current user; and determining the second video from the second video candidate set according to the user feature information of the current user, the background historical operation information, and the preset background video recommendation model, where the intermediate output result can be understood as an output result of an intermediate layer of the preset non-background video recommendation model. Exemplarily, the user feature information can be understood as user portrait information, which can exist in the form of feature vectors, etc., and can reflect the user's preference information in some aspects, such as liking to listen to an actor's talk show, etc. Such preference information can be understood as personalized information of the current user, which information will generally not change in a short period of time due to changes in the running state of the preset application. The intermediate output result may also contain other information that is helpful for the preset background video recommendation model to accurately determine videos to be recommended. The advantage of such setting lies in that the non-background historical operation information is richer than the background historical operation information, and the user feature information can be quickly and accurately determined, while the background historical operation information is more in line with background playback scenarios; the combination of the two pieces of information, as the input of the preset background video recommendation model, can more accurately determine background playback videos to be recommended that suit the current user. In addition, it is conducive to simplifying the preset background video recommendation model and preventing excessive occupation of background resources.

In some embodiments, determining a second video from a second video candidate set according to historical operation information of a current user for the preset application and a preset background video recommendation model includes: determining second video candidate subsets from the second video candidate set corresponding to the preset background video recommendation model according to the non-background historical operation information and the preset non-background video recommendation model; and determining the second video from the second video candidate subsets according to the background historical operation information and the preset background video recommendation model. The advantage of such setting lies in that videos in the second video candidate set are initially screened by using the non-background historical operation information and the preset non-background video recommendation model to obtain the second video candidate subsets, and then the second video is determined from the second video candidate subsets by using the background historical operation information and the preset background video recommendation model. By making full use of the user's historical operation information in both non-background and background and combining characteristics of the two video recommendation models, videos to be recommended that meet the user's preferences and are suitable to play in the background can be quickly and accurately determined.

In some embodiments, training data used by the preset background video recommendation model in a training phase includes at least one of the user feature information and a user sample corresponding to the preset non-background video recommendation model. The advantage of such setting lies in that, since non-background recommended videos are richer and user operation information is richer, the user feature information and/or the user sample corresponding to the preset non-background video recommendation model can more comprehensively and accurately reflect the user's personalized features, and using at least one of the user feature information and the user sample corresponding to the preset non-background video recommendation model as training data enables the preset background video recommendation model obtained by training to more accurately identify user features, so as to determine background recommended videos that match the user features.

In some embodiments, determining a second video from a second video candidate set according to historical operation information of a current user for the preset application and a preset background video recommendation model includes: when it is determined that the data amount of the background historical operation information is less than a preset data amount threshold corresponding to the preset background video recommendation model, determining the second video from the second video candidate set according to the non-background historical operation information and the preset non-background video recommendation model. The advantage of such setting lies in that the accumulation of user operation information is generally required when the preset background video recommendation model is used for video recommendations, and for users who rarely enter background playback or the background video playback function having just been put into use, the background historical operation information is often less, which will affect the accuracy of recommendation results; at this time, the non-background historical operation information and the preset non-background video recommendation model can be first used to determine the second video from the second video candidate set, so that users can be provided with personalized background video recommendation functions even in a cold start phase.

In some embodiments, the second video candidate set includes videos of a first type and videos of a second type, the image information amount in the videos of the first type is less than or equal to a first preset information amount threshold, the image information amount in the videos of the second type is greater than a second preset information amount threshold, and the second preset information amount threshold is greater than or equal to the first preset information amount threshold. For the videos of the first type, input data when using the preset background video recommendation model includes audio information in the videos of the first type; and for the videos of the second type, input data when using the preset background video recommendation model includes image information and audio information in the videos of the first type. The advantage of such setting lies in that videos can be divided from the perspective of the richness of picture information, and different inputs are used for different types of videos, making recommendation results of the model more targeted.

Exemplarily, in the process of video creation, there may be situations where more emphasis is placed on audio creation, such as telling one's views on a hot event or telling stories, etc. In this case, the configured pictures may be a small number of one or several static pictures, the picture information is relatively scarce, and the picture content may be less useful for understanding the audio content. This kind of videos are closer to audios, and can therefore be classified as the videos of the first type. The image information amount in the videos can be determined according to the sum of the image information amount in various video frames (excluding repeated video frames), and the image information amount can be calculated, for example, through information entropy or other modes.

For the videos of the first type with a small image information amount, the image information can be ignored when using the preset background video recommendation model for video recommendations; while for the videos of the second type with a large image information amount, both image information and audio information can be considered at the same time when using the preset background video recommendation model for video recommendations. In this way, background recommendations can be carried out more accurately for videos of different types.

Optionally, as an implementation, different background video recommendation models can be provided respectively for the videos of the first type and the videos of the second type, such as a first preset background video recommendation model and a second background video recommendation model, which two models are trained and used separately. When background video recommendations are required, first videos to be recommended of a first number can be determined according to the historical operation information and the first preset background video recommendation model, second videos to be recommended of a second number can be determined according to the historical operation information and the second preset background video recommendation model, the first videos to be recommended and the second videos to be recommended are mixed and sorted to obtain a queue of videos to be recommended, and then the next video that needs to be played in the background is determined sequentially from the queue of videos to be recommended.

Optionally, the videos of the first type may not be suitable for non-background playback. In the case that the videos of the first type are not contained when carrying out non-background video recommendations, after entering the background running state, there may be no non-background operation information to refer to. At this time, corresponding cold start processing can be performed on the videos of the first type, for example, the video of the first type with a higher current popularity ranking can be determined as a first video to be recommended.

Figure 2:
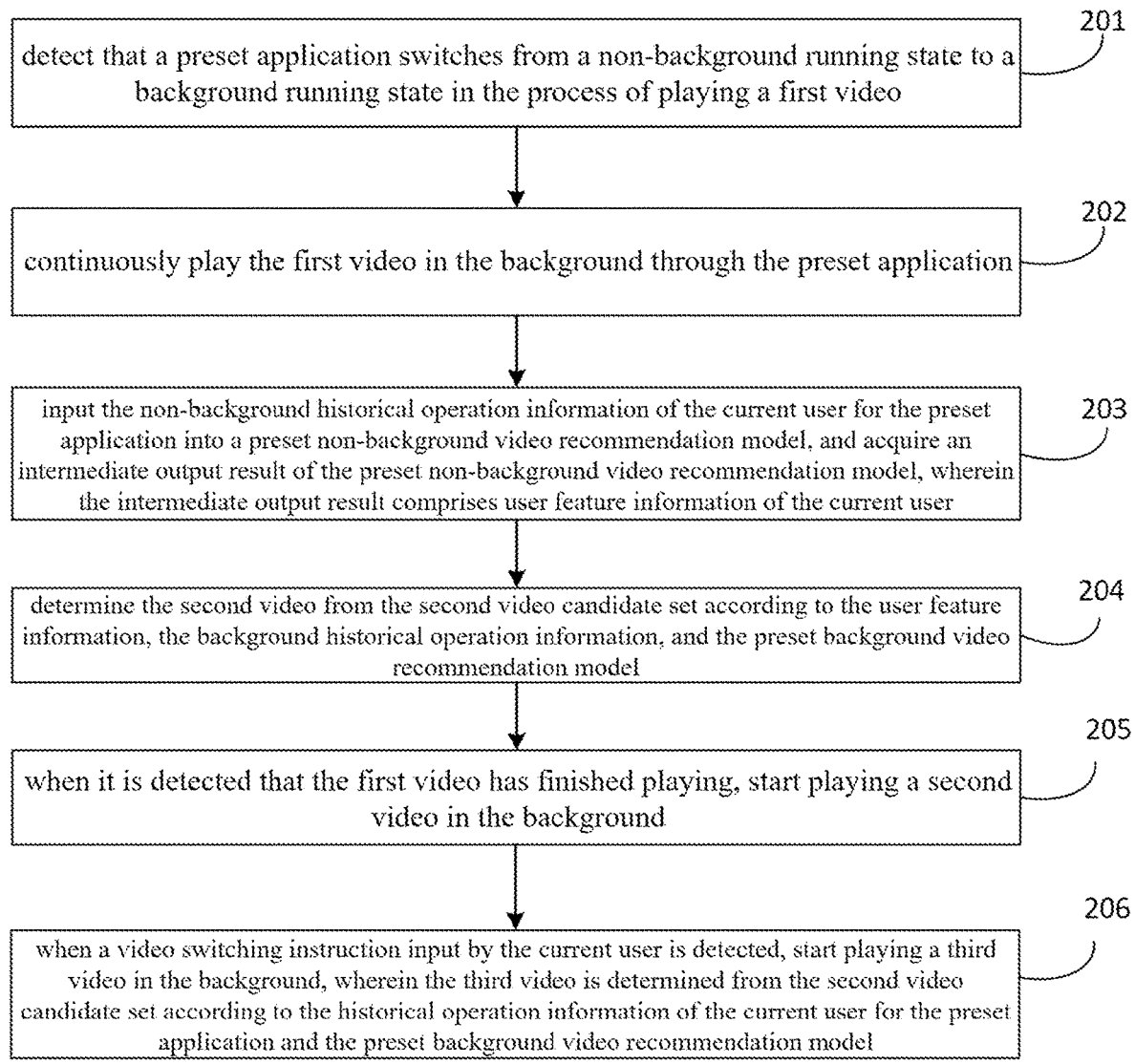
FIG. 2 is a schematic flowchart of another video playback method provided in an embodiment of the present disclosure.

FIG. 2 is a schematic flowchart of another video playback method provided in an embodiment of the present disclosure. The embodiment of the present disclosure is modified based on a plurality of optional solutions in the above embodiments. The method includes the following steps:

step 201, detect that a preset application switches from a non-background running state to a background running state in a process of playing a first video.

Exemplarily, the preset application is a short video application. When browsing a short video stream with the short video application, the user can switch the preset application to run in the background in the case of a need to operate other applications. For example, a short video A is currently being played, and the user can slide from the bottom of the screen to enter the desktop of the terminal. At this time, a floating control bar can be displayed on the desktop interface, which floating control bar can include sub-controls such as a pause button and a next button. After that, the user can also start other applications.

Step 202, continuously play the first video in the background through the preset application.

After the short video application is switched to run in the background, the short video A can continue to be played in the background.

Exemplarily, assuming that the total duration of the short video A is 3 minutes, the user switches the short video application to run in the background when the short video A is played to 1 minute, at which time the point in time of 1 minute can be recorded and the audio corresponding to the short video A continues to be played backwards from 1 minute.

Step 203, input the non-background historical operation information of the current user for the preset application into a preset non-background video recommendation model, and acquire an intermediate output result of the preset non-background video recommendation model, where the intermediate output result includes user feature information of the current user.

Exemplarily, the non-background historical operation information may include the operation information of the current user when using the short video application to browse the short video stream in the non-background in the past month, and the non-background historical operation information is input into the preset non-background video recommendation model. It should be noted that other data may also need to be input when using the preset non-background video recommendation model. Subsequently, the user feature information of the current user is acquired from the output result of the intermediate layer of the preset non-background video recommendation model.

Step 204, determine the second video from the second video candidate set according to the user feature information, the background historical operation information, and the preset background video recommendation model.

Exemplarily, the user feature information of the current user, the background historical operation information, and the feature information of various candidate videos in the second video candidate set can be input into the preset background video recommendation model as input data, and the second video is determined according to the output result of the preset background video recommendation model.

Videos in the second video candidate set satisfy preset conditions, and the preset conditions include at least one of matching a preset video category, the ratio of the duration containing voice content to the total duration of the videos being greater than a preset ratio threshold, and the total duration of the videos being greater than a preset duration threshold.

Step 205, when it is detected that the first video has finished playing, start playing a second video in the background.

It should be noted that a video switching instruction input by the current user is received before the first video has finished playing, and the second video can also start playing in the background.

Step 206, when the video switching instruction input by the current user is received, start playing a third video in the background, where the third video is determined from the second video candidate set according to the historical operation information of the current user for the preset application and the preset background video recommendation model.

Exemplarily, if the user is not interested in the audio content of the currently playing second video while using other non-background applications, the user can complete the input of the video switching instruction by clicking on the next button in the floating control bar, which enables switching to the background playback of the next video.

It should be noted that in the case that the video switching instruction input by the current user has not been received when the second video has finished playing, the third video can also automatically start playing in the background.

According to the video playback method provided in the embodiment of the present disclosure, in the process of the preset application playing a video stream in the non-background, the user switches the preset application to run in the background so that the background playback of the current video in an audio form can be continued, user feature information is determined combined with the user's non-background historical operation information and the preset non-background video recommendation model, and then video streams suitable for playing in the background are continuously recommended to the user by using the user feature information, the background historical operation information, and the preset background video recommendation model. In the process of the background playback, continuous automatic playback can be realized, and users are also supported to input video switching instructions, thereby providing users with new content consumption forms, improving user experience, improving performance of applications, and also increasing the exposure of videos on the platform, and improving the utilization of platform resources.

Figure 3:
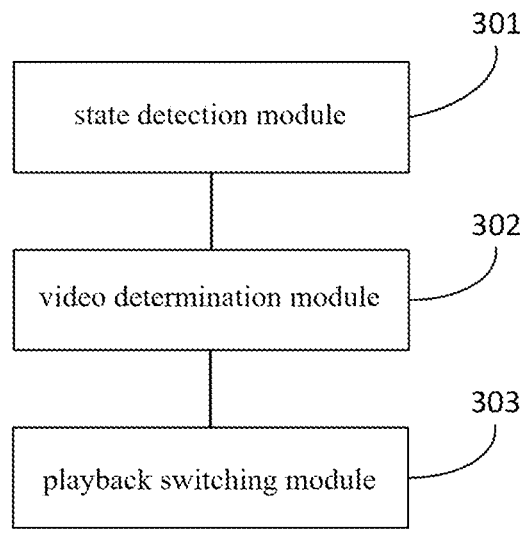
FIG. 3 is a structural block diagram of a video playback apparatus provided in an embodiment of the present disclosure.

FIG. 3 is a structural block diagram of a video playback apparatus provided in an embodiment of the present disclosure. The apparatus can be implemented by software and/or hardware, generally can be integrated in an electronic device, and can perform video playback by executing the video playback method. As shown in FIG. 3, the apparatus includes:

a state detection module 301, which is configured to detect whether a preset application switches from a non-background running state to a background running state in the process of playing a first video, where the preset application is used to play a video stream;

a video determination module 302, which is continuously play, after detecting that the preset application switches from the non-background running state to the background running state in the process of playing the first video, the first video in the background through the preset application, and determine a second video from a second video candidate set according to historical operation information of a current user for the preset application and a preset background video recommendation model, where the preset background video recommendation model is used to determine background playback videos to be recommended, the second video candidate set is used to filter videos there-from in a background playback mode, the second video candidate set is different from the first video candidate set, and the first video candidate set is used to filter videos there-from in a non-background playback mode; and a playback switching module 303, which is configured to play, when a preset video switching event is detected, the second video in the background through the preset application.

By means of the video playback apparatus provided in the embodiment of the present disclosure, video recommendations of the preset application respectively in the non-background running state and the background running state are distinguished; after the non-background running state is switched to the background running state, the video being played continues to be played in the background, and a video recommendation model and a video candidate set which are different from those in the non-background running condition are adopted; videos suitable for being played in the background are determined with reference to the historical operation information of the current user; and the videos are played when a preset video switching event is detected, so that users acquiring continuity of video information can be ensured, and personalized video recommendations are more accurately carried out in the background running state, thereby improving the performance of applications.

Optionally, videos in the second video candidate set satisfy preset conditions, and the preset conditions include at least one of matching a preset video category, the ratio of the duration containing voice content to the total duration of the videos being greater than a preset ratio threshold, and the total duration of the videos being greater than a preset duration threshold.

Optionally, the playback switching module is further configured to: after starting playing the second video in the background through the preset application and when the preset video switching event is detected, play a third video in the background through the preset application, where the third video is determined from the second video candidate set according to the historical operation information of the current user for the preset application and the preset background video recommendation model.

Optionally, detecting a preset video switching event includes: detecting that the current video has finished playing; or, receiving a video switching instruction input by the current user.

Optionally, the historical operation information includes non-background historical operation information and background historical operation information. The video determination module includes a continuation playback unit, which is configured to continuously play, after detecting that the preset application switches from the non-background running state to the background running state in the process of playing the first video, the first video in the background through the preset application; and a video determination unit, which is configured to input the non-background historical operation information into a preset non-background video recommendation model, and acquire an intermediate output result of the preset non-background video recommendation model, where the preset non-background video recommendation model is used to determine non-background playback videos to be recommended, and the intermediate output result includes user feature information of the current user; and determining the second video from the second video candidate set according to the user feature information of the current user, the background historical operation information, and the preset background video recommendation model.

Optionally, training data used by the preset background video recommendation model in a training phase includes at least one of the user feature information and a user sample corresponding to the preset non-background video recommendation model.

Optionally, the video determination unit is configured to: when it is determined that the data amount of the background historical operation information is less than a preset data amount threshold corresponding to the preset background video recommendation model, determine the second video from the second video candidate set according to the non-background historical operation information and the preset non-background video recommendation model.

Optionally, the second video candidate set includes videos of a first type and videos of a second type, the image information amount in the videos of the first type is less than or equal to a first preset information amount threshold, the image information amount in the videos of the second type is greater than a second preset information amount threshold, and the second preset information amount threshold is greater than or equal to the first preset information amount threshold. For the videos of the first type, input data when using the preset background video recommendation model includes audio information in the videos of the first type; and for the videos of the second type, input data when using the preset background video recommendation model includes image information and audio information in the videos of the first type.

Figure 4:
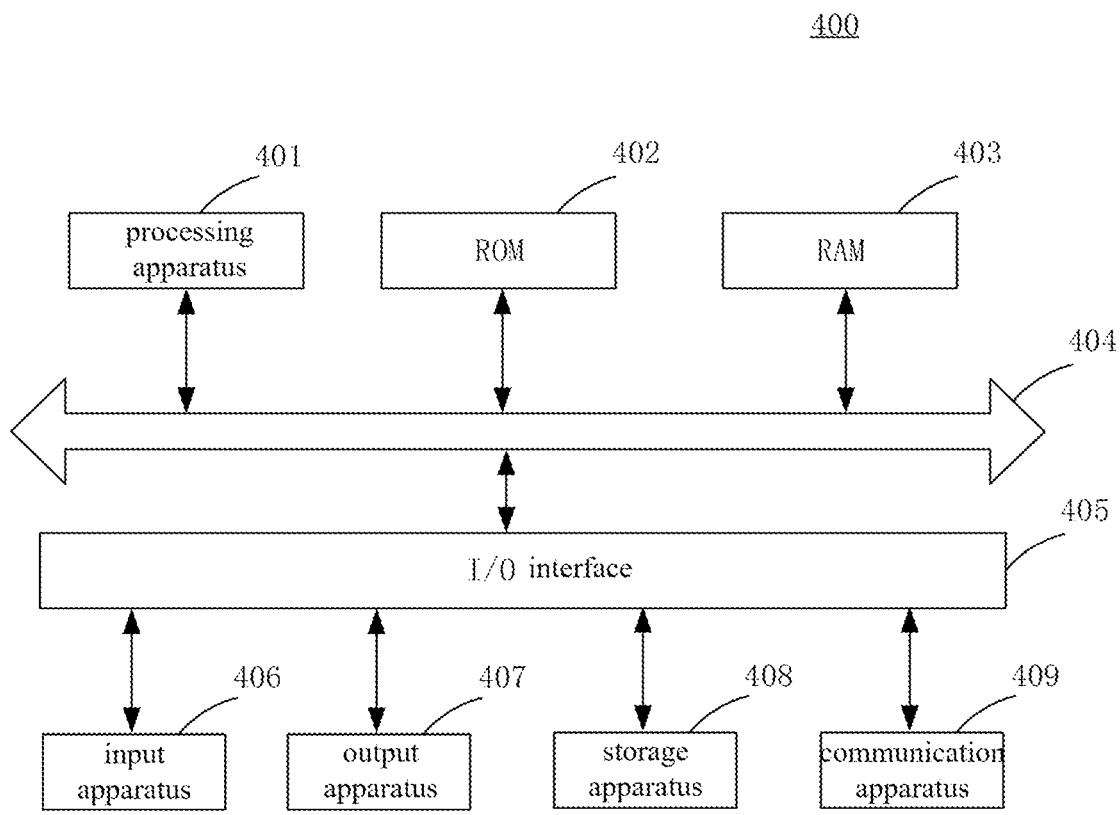
FIG. 4 is a structural block diagram of an electronic device provided in an embodiment of the present disclosure.

Referring now to FIG. 4, a schematic structural diagram of an electronic device 400 suitable for implementing the embodiments of the present disclosure is shown. Electronic devices in the embodiments of the present disclosure may include mobile terminals such as a mobile phone, a laptop, a digital broadcast receiver, a personal digital assistant (PDA), a portable Android device (PAD), a portable media player (PMP), and a vehicle-mounted terminals (such as a vehicle-mounted navigation terminals), as well as fixed terminals such as a digital TV and a desktop computer. The electronic device shown in FIG. 4 is only an example.

As shown in FIG. 4, the electronic device 400 may include a processing apparatus 401 (e.g., a central processing unit, and a graphics processor), which may execute various appropriate actions and processes according to programs stored in a read-only memory (ROM) 402 or programs loaded from a storage apparatus 408 into a random access memory (RAM) 403. In the RAM 403, various programs and data required for the operation of the electronic device 400 are also stored. The processing apparatus 401, ROM 402 and RAM 403 are connected to each other via a bus 404. An input/output (I/O) interface 405 is also connected to the bus 404.

Generally, the following apparatuses may be connected to the I/O interface 405: an input apparatus 406 including, for example, a touch screen, a touch pad, a keyboard, a mouse, a camera, a microphone, an accelerometer, and a gyroscope; an output apparatus 407 including, for example, a liquid crystal display (LCD), a speaker, and a vibrator; the storage apparatus 408 including, for example, a magnetic tape, and a hard disk; and a communication apparatus 409. The communication apparatus 409 may allow the electronic device 400 to communicate with other devices in a wireless or wired manner, so as to exchange data. Although FIG. 4 illustrates the electronic device 400 with various apparatuses, it should be understood that it is not required to implement or provide all of the illustrated apparatuses. More or fewer apparatuses may alternatively be implemented or provided.

In particular, according to the embodiments of the present disclosure, the processes described above with reference to the flowcharts may be implemented as computer software programs. For example, an embodiment of the present disclosure includes a computer program product including a computer program carried on a non-transitory computer-readable medium, the computer program containing program codes for performing the method illustrated in the flowchart. In such embodiment, the computer program may be downloaded and installed from the network through the communication apparatus 409, or installed from the storage apparatus 408, or installed from the ROM 402. When the computer program is executed by the processing apparatus 401, the above functions in the method of the embodiment of the present disclosure are performed.

It should be noted that the computer-readable medium mentioned above in the present disclosure may be a computer-readable signal medium or a computer-readable storage medium, or any combination of the above two. The computer-readable storage medium may be, for example, an electrical, magnetic, optical, electromagnetic, infrared, or semiconductor system, apparatus or device, or any combination thereof. Computer-readable storage media may include, but are not limited to: an electrical connection having one or more wires, a portable computer disk, a hard drive, a random access memory (RAM), a read-only memory (ROM), an erasable programmable read-only memory (EPROM or a flash memory), fiber optics, a portable compact disk read-only memory (CD-ROM), an optical storage device, a magnetic storage device, or any suitable combination of the above. In the present disclosure, the computer-readable storage medium may be any tangible medium that contains or stores a program for use by or in connection with an instruction execution system, apparatus, or device. While in the present disclosure, the computer-readable signal medium may include a data signal propagated in a baseband or as part of a carrier wave, carrying computer-readable program codes therein. Such propagated data signals may take many forms, including electromagnetic signals, optical signals, or any suitable combination of the above. The computer-readable signal medium may also be any computer-readable medium other than the computer-readable storage medium that can send, propagate, or transmit a program for use by or in connection with the instruction execution system, apparatus, or device. The program codes embodied on the computer-readable medium may be transmitted using any suitable medium, including a wire, an optical cable, a radio frequency (RF), etc., or any suitable combination of the above.

The above computer-readable medium may be contained in the above electronic device, and may also exist independently without being assembled into the electronic device.

The above computer-readable medium carries one or more programs which, when executed by the electronic device, causes the electronic device to: detect that a preset application switches from a non-background running state to a background running state in a process of playing a first video, where the preset application is used to play a video stream; continuously play the first video in the background through the preset application, and determine a second video from a second video candidate set according to historical operation information of a current user for the preset application and a preset background video recommendation model, where the preset background video recommendation model is used to determine a background playback video to be recommended, the second video candidate set is used to filter a video there-from in a background playback mode, the second video candidate set is different from the first video candidate set, and the first video candidate set is used to filter a video there-from in a non-background playback mode; and when a preset video switching event is detected, play the second video in the background through the preset application.

Computer program codes for performing operations of the present disclosure may be written in one or more programming languages or a combination thereof. The above programming languages include object-oriented programming languages such as Java, Smalltalk and C++, and include conventional procedural programming languages such as "C" or similar programming languages. The program codes may be executed entirely on the user's computer, partly on the user's computer, as a stand-alone software package, partly on the user's computer and partly on a remote computer, or entirely on the remote computer or a server. In situations involving a remote computer, the remote computer can be connected to the user's computer through any kind of networks, including a local area network (LAN) or a wide area network (WAN), or can be connected to an external computer (e.g., using an Internet service provider for connection through the Internet).

The flowcharts and block diagrams in the accompanying drawings illustrate the architecture, functionality, and operations of possible implementations of the system, method, and computer program product according to various embodiments of the present disclosure. In this regard, each block in the flowcharts or block diagrams may represent a module, a segment, or part of codes that contains one or more executable instructions used to implement specified logic functions. It should also be noted that, in some alternative implementations, the functions noted in the blocks may occur out of the order noted in the accompanying drawings. For example, two blocks shown one after another may actually execute substantially in parallel, or may sometimes execute in the reverse order, depending on the functionality involved. It will also be noted that each block in the block diagrams and/or flowcharts, and combinations of the blocks in the block diagrams and/or flowcharts can be implemented with specialized hardware-based systems that perform the specified functions or operations, or can be implemented with a combination of specialized hardware and computer instructions.

The modules involved in the embodiments of the present disclosure can be implemented in software or hardware. Names of the modules do not constitute a limitation on the modules themselves under a circumstance. For example, the playback switching module can also be described as "a module that plays the second video through the preset application when a preset video switching event is detected".

The functions described above herein may be performed, at least in part, by one or more hardware logic components. For example, exemplary types of hardware logic components that may be used include: a field programmable gate array (FPGA), an application specific integrated circuit (ASIC), application specific standard parts (ASSPs), a system on chip (SOC), a complex programmable logical device (CPLD), etc.

In the context of the present disclosure, a machine-readable medium may be a tangible medium that may contain or store a program for use by or in connection with an instruction execution system, apparatus, or device. The machine-readable medium may be a machine-readable signal medium or a machine-readable storage medium. The machine-readable medium may include electronic, magnetic, optical, electromagnetic, infrared, or semiconductor systems, apparatuses or devices, or any suitable combination of the above. The machine-readable storage medium may include one or more wire-based electrical connections, a laptop disk, a hard drive, a random access memory (RAM), a read-only memory (ROM), an erasable programmable read-only memory (EPROM or a flash memory), fiber optics, a portable compact disk read-only memory (CD-ROM), an optical storage device, a magnetic storage device, or any suitable combination of the above.

According to one or more embodiments of the present disclosure, Example 1 provides a video playback method, including:

detecting that a preset application switches from a non-background running state to a background running state in a process of playing a first video, where the preset application is used to play a video stream;

continuously playing the first video in the background through the preset application, and determining a second video from a second video candidate set according to historical operation information of a current user for the preset application and a preset background video recommendation model, where the preset background video recommendation model is used to determine a background playback video to be recommended, the second video candidate set is used to filter a video there-from in a background playback mode, the second video candidate set is different from the first video candidate set, and the first video candidate set is used to filter a video there-from in a non-background playback mode; and when a preset video switching event is detected, playing the second video in the background through the preset application.

According to one or more embodiments of the present disclosure, Example 2 is based on the method of Example 1. A video in the second video candidate set satisfies a preset condition, and the preset condition includes at least one of matching a preset video category, a ratio of a duration containing voice content to a total duration of the video being greater than a preset ratio threshold, and the total duration of the video being greater than a preset duration threshold.

According to one or more embodiments of the present disclosure, Example 3 is based on the method of Example 1. After starting playing the second video in the background through the preset application, the method further includes:

when the preset video switching event is detected, playing a third video in the background through the preset application, where the third video is determined from the second video candidate set according to the historical operation information of the current user for the preset application and the preset background video recommendation model.

According to one or more embodiments of the present disclosure, Example 4 is based on the method of Example 1. Detecting a preset video switching event includes:

detecting that the current video has finished playing; or, receiving a video switching instruction input by the current user.

According to one or more embodiments of the present disclosure, Example 5 is based on the method of any one of Examples 1-4. The historical operation information includes non-background historical operation information and background historical operation information;

determining a second video from a second video candidate set according to historical operation information of a current user for the preset application and a preset background video recommendation model includes:

inputting the non-background historical operation information into a preset non-background video recommendation model, and acquiring an intermediate output result of the preset non-background video recommendation model, where the preset non-background video recommendation model is used to determine a non-background playback video to be recommended, and the intermediate output result includes user feature information of the current user; and determining the second video from the second video candidate set according to the user feature information of the current user, the background historical operation information, and the preset background video recommendation model.

According to one or more embodiments of the present disclosure, Example 6 is based on the method of Example 5. Training data used by the preset background video recommendation model in a training phase includes at least one of the user feature information and a user sample corresponding to the preset non-background video recommendation model.

According to one or more embodiments of the present disclosure, Example 7 is based on the method of Example 5. Determining a second video from a second video candidate set according to historical operation information of a current user for the preset application and a preset background video recommendation model includes:

when it is determined that the data amount of the background historical operation information is less than a preset data amount threshold corresponding to the preset background video recommendation model, determining the second video from the second video candidate set according to the non-background historical operation information and the preset non-background video recommendation model.

According to one or more embodiments of the present disclosure, Example 8 is based on the method of Example 1. The second video candidate set includes videos of a first type and videos of a second type, the image information amount in the videos of the first type is less than or equal to a first preset information amount threshold, the image information amount in the videos of the second type is greater than a second preset information amount threshold, and the second preset information amount threshold is greater than or equal to the first preset information amount threshold;

for the videos of the first type, input data when using the preset background video recommendation model includes audio information in the videos of the first type; and for the videos of the second type, input data when using the preset background video recommendation model includes image information and audio information in the videos of the first type.

According to one or more embodiments of the present disclosure, Example 9 provides a video playback apparatus, including:

a state detection module, which is configured to detect whether a preset application switches from a non-background running state to a background running state in a process of playing a first video, where the preset application is used to play a video stream;

a video determination module, which is configured to continuously play, after detecting that the preset application switches from the non-background running state to the background running state in the process of playing the first video, the first video in the background through the preset application, and determine a second video from a second video candidate set according to historical operation information of a current user for the preset application and a preset background video recommendation model, where the preset background video recommendation model is used to determine a background playback video to be recommended, the second video candidate set is used to filter a video there-from in a background playback mode, the second video candidate set is different from the first video candidate set, and the first video candidate set is used to filter a video there-from in a non-background playback mode; and a playback switching module, which is configured to play, when a preset video switching event is detected, the second video in the background through the preset application.

What is claimed is:

1. A video playback method, comprising:

detecting that a preset application switches from a non-background running state to a background running state in a process of playing a first video, wherein the preset application is used to play a video stream;

continuously playing the first video in the background through the preset application, and determining a second video from a second video candidate set according to historical operation information of a current user for the preset application and a preset background video recommendation model, wherein the preset background video recommendation model is used to determine a background playback video to be recommended, the second video candidate set is used to filter a video there-from in a background playback mode, the second video candidate set is different from the first video candidate set, and the first video candidate set is used to filter a video there-from in a non-background playback mode; and when a preset video switching event is detected, playing the second video in the background through the preset application, wherein the second video candidate set comprises videos of a first type and videos of a second type, an image information amount in the videos of the first type is less than or equal to a first preset information amount threshold, an image information amount in the videos of the second type is greater than a second preset information amount threshold, and the second preset information amount threshold is greater than or equal to the first preset information amount threshold, wherein for the videos of the first type, input data when using the preset background video recommendation model comprises audio information in the videos of the first type; and for the videos of the second type, input data when using the preset background video recommendation model comprises image information and audio information in the videos of the first type.

2. The method according to claim 1, wherein a video in the second video candidate set satisfies a preset condition, and the preset condition comprises at least one of matching a preset video category, a ratio of a duration containing voice content to a total duration of the video being greater than a preset ratio threshold, and the total duration of the video being greater than a preset duration threshold.

3. The method according to claim 1, after starting playing the second video in the background through the preset application, further comprising:
when the preset video switching event is detected, playing a third video in the background through the preset application, wherein the third video is determined from the second video candidate set according to the historical operation information of the current user for the preset application and the preset background video recommendation model.

4. The method according to claim 1, wherein detecting the preset video switching event comprises:
detecting that the current video has finished playing; or, receiving a video switching instruction input by the current user.

5. The method according to claim 1, wherein the historical operation information comprises non-background historical operation information and background historical operation information;
the determining a second video from a second video candidate set according to historical operation information of a current user for the preset application and a preset background video recommendation model comprises:
inputting the non-background historical operation information into a preset non-background video recommendation model, and acquiring an intermediate output result of the preset non-background video recommendation model, wherein the preset non-background video recommendation model is used to determine a non-background playback video to be recommended, and the intermediate output result comprises user feature information of the current user; and
determining the second video from the second video candidate set according to the user feature information of the current user, the background historical operation information, and the preset background video recommendation model.

6. The method according to claim 5, wherein training data used by the preset background video recommendation model in a training phase comprises at least one of the user feature information and a user sample corresponding to the preset non-background video recommendation model.

7. The method according to claim 5, wherein determining a second video from a second video candidate set according to historical operation information of a current user for the preset application and a preset background video recommendation model comprises:
when it is determined that a data amount of the background historical operation information is less than a preset data amount threshold corresponding to the preset background video recommendation model, determining the second video from the second video candidate set according to the non-background historical operation information and the preset non-background video recommendation model.

8. An electronic device, comprising a memory, a processor, and a computer program that is stored in the memory and executable on the processor, wherein when the processor executes the computer program, the following operations are implemented:
detecting that a preset application switches from a non-background running state to a background running state in a process of playing a first video, wherein the preset application is used to play a video stream;
continuously playing the first video in the background through the preset application, and determining a second video from a second video candidate set according to historical operation information of a current user for the preset application and a preset background video recommendation model, wherein the preset background video recommendation model is used to determine a background playback video to be recommended, the second video candidate set is used to filter a video there-from in a background playback mode, the second video candidate set is different from the first video candidate set, and the first video candidate set is used to filter a video there-from in a non-background playback mode; and
when a preset video switching event is detected, playing the second video in the background through the preset application,
wherein the second video candidate set comprises videos of a first type and videos of a second type, an image information amount in the videos of the first type is less than or equal to a first preset information amount threshold, an image information amount in the videos of the second type is greater than a second preset information amount threshold, and the second preset information amount threshold is greater than or equal to the first preset information amount threshold,
wherein for the videos of the first type, input data when using the preset background video recommendation model comprises audio information in the videos of the first type; and
for the videos of the second type, input data when using the preset background video recommendation model comprises image information and audio information in the videos of the first type.

9. The electronic device according to claim 8, wherein a video in the second video candidate set satisfies a preset condition, and the preset condition comprises at least one of matching a preset video category, a ratio of a duration containing voice content to a total duration of the video being greater than a preset ratio threshold, and the total duration of the video being greater than a preset duration threshold.

10. The electronic device according to claim 8, after starting playing the second video in the background through the preset application, when the processor executes the computer program, the following operations are implemented:
when the preset video switching event is detected, playing a third video in the background through the preset application, wherein the third video is determined from the second video candidate set according to the historical operation information of the current user for the preset application and the preset background video recommendation model.

11. The electronic device according to claim 8, wherein detecting the preset video switching event comprises:
detecting that the current video has finished playing; or, receiving a video switching instruction input by the current user.

12. The electronic device according to claim 8, wherein the historical operation information comprises non-background historical operation information and background historical operation information;
the determining a second video from a second video candidate set according to historical operation information of a current user for the preset application and a preset background video recommendation model comprises:

inputting the non-background historical operation information into a preset non-background video recommendation model, and acquiring an intermediate output result of the preset non-background video recommendation model, wherein the preset non-background video recommendation model is used to determine a non-background playback video to be recommended, and the intermediate output result comprises user feature information of the current user; and determining the second video from the second video candidate set according to the user feature information of the current user, the background historical operation information, and the preset background video recommendation model.

13. The electronic device according to claim 12, wherein training data used by the preset background video recommendation model in a training phase comprises at least one of the user feature information and a user sample corresponding to the preset non-background video recommendation model.

14. A non-transitory computer-readable storage medium on which a computer program is stored, wherein when the program is executed by a processor, the following operations are implemented:

detecting that a preset application switches from a non-background running state to a background running state in a process of playing a first video, wherein the preset application is used to play a video stream;

continuously playing the first video in the background through the preset application, and determining a second video from a second video candidate set according to historical operation information of a current user for the preset application and a preset background video recommendation model, wherein the preset background video recommendation model is used to determine a background playback video to be recommended, the second video candidate set is used to filter a video there-from in a background playback mode, the second video candidate set is different from the first video candidate set, and the first video candidate set is used to filter a video there-from in a non-background playback mode; and when a preset video switching event is detected, playing the second video in the background through the preset application, wherein the second video candidate set comprises videos of a first type and videos of a second type, an image information amount in the videos of the first type is less than or equal to a first preset information amount threshold, an image information amount in the videos of the second type is greater than a second preset information amount threshold, and the second preset information amount threshold is greater than or equal to the first preset information amount threshold, wherein for the videos of the first type, input data when using the preset background video recommendation model comprises audio information in the videos of the first type; and for the videos of the second type, input data when using the preset background video recommendation model comprises image information and audio information in the videos of the first type.

15. The non-transitory computer-readable storage medium according to claim 14, wherein a video in the second video candidate set satisfies a preset condition, and the preset condition comprises at least one of matching a preset video category, a ratio of a duration containing voice content to a total duration of the video being greater than a preset ratio threshold, and the total duration of the video being greater than a preset duration threshold.

16. The non-transitory computer-readable storage medium according to claim 14, after starting playing the second video in the background through the preset application, when the program is executed by the processor, the following operations are implemented:

when the preset video switching event is detected, playing a third video in the background through the preset application, wherein the third video is determined from the second video candidate set according to the historical operation information of the current user for the preset application and the preset background video recommendation model.

17. The non-transitory computer-readable storage medium according to claim 14, wherein detecting the preset video switching event comprises:

detecting that the current video has finished playing; or,
receiving a video switching instruction input by the current user.

18. The non-transitory computer-readable storage medium according to claim 14, wherein the historical operation information comprises non-background historical operation information and background historical operation information;

the determining a second video from a second video candidate set according to historical operation information of a current user for the preset application and a preset background video recommendation model comprises:

inputting the non-background historical operation information into a preset non-background video recommendation model, and acquiring an intermediate output result of the preset non-background video recommendation model, wherein the preset non-background video recommendation model is used to determine a non-background playback video to be recommended, and the intermediate output result comprises user feature information of the current user; and determining the second video from the second video candidate set according to the user feature information of the current user, the background historical operation information, and the preset background video recommendation model.

19. The non-transitory computer-readable storage medium according to claim 18, wherein training data used by the preset background video recommendation model in a training phase comprises at least one of the user feature information and a user sample corresponding to the preset non-background video recommendation model.

* * * * *